(12) United States Patent
Deters

(10) Patent No.: US 11,104,563 B1
(45) Date of Patent: Aug. 31, 2021

(54) FLEXIBLE CONDUCTIVE PLATFORM LINER

(71) Applicant: Altec Industries, Inc., Birmingham, AL (US)

(72) Inventor: Joseph Scott Deters, Duluth, MN (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 17/091,708

(22) Filed: Nov. 6, 2020

(51) Int. Cl.
| | |
|---|---|
| *B66F 11/04* | (2006.01) |
| *H01B 5/00* | (2006.01) |
| *H02B 1/06* | (2006.01) |
| *H02G 1/02* | (2006.01) |
| *H02G 7/00* | (2006.01) |
| *B66F 17/00* | (2006.01) |

(52) U.S. Cl.
CPC ............ *B66F 17/006* (2013.01); *H01B 5/00* (2013.01)

(58) Field of Classification Search
CPC .... A62B 35/0068; B66F 11/04; B66F 11/044; B66F 11/046; B66F 17/006; B66F 17/00; F16M 13/02; H02B 1/06; H01B 5/00; H02G 1/02; H02G 7/00

USPC ................................... 174/5 R; 182/46, 69.6
See application file for complete search history.

(56) References Cited

U.S. PATENT DOCUMENTS

| | | | | |
|---|---|---|---|---|
| 3,139,948 | A  * | 7/1964 | Rorden | B66F 11/044 |
| | | | | 182/2.4 |
| 4,673,613 | A  * | 6/1987 | Ward | A47C 7/26 |
| | | | | 264/271.1 |
| 2004/0077937 | A1* | 4/2004 | Yarden | A61B 5/25 |
| | | | | 600/386 |
| 2005/0204669 | A1* | 9/2005 | Gierss | G03B 15/07 |
| | | | | 52/475.1 |
| 2010/0101007 | A1 | 4/2010 | Carraro | |
| 2016/0368738 | A1 | 12/2016 | Minke | |
| 2017/0283995 | A1* | 10/2017 | Ishikawa | B32B 7/02 |

* cited by examiner

*Primary Examiner* — Timothy J Thompson
*Assistant Examiner* — Guillermo J Egoavil
(74) *Attorney, Agent, or Firm* — Erise IP, P.A.

(57) ABSTRACT

A flexible and electrically conductive platform liner is provided for lining an aerial work platform. The platform liner is composed of a flexible and electrically conductive material, such that it is foldable for transport and storage. The platform liner is configured to be placed into the aerial work platform and electrically bonded to an energized power line during operation, such that the platform liner is held at a similar electrical potential to the energized power line.

19 Claims, 9 Drawing Sheets

FLEXIBLE CONDUCTIVE PLATFORM LINER

BACKGROUND

1. Field

Embodiments of the invention relate to platform liners for aerial work platforms. More specifically, embodiments of the invention relate to flexible conductive platform liners for aerial work platforms.

2. Related Art

Category A aerial devices typically comprise fiberglass platforms, which require the use of a conductive platform liner placed within the fiberglass platform to perform high-voltage work and especially barehand work. Traditionally, the conductive platform liner is composed of a heavy, rigid material, such as aluminum sheet metal. As such, difficulty arises when handling and storing the sheet metal platform liner. These traditional sheet metal platform liners can weigh about 75 pounds and take up a significant amount of space during storage and transport.

In many cases, it is desirable to swap out platform liners during operation to perform various types of work. For example, when switching between gloving work and barehand work, a poly platform liner is swapped out for a conductive sheet metal liner. Accordingly, since the sheet metal liner is heavy and difficult to handle, it places additional difficulties on operators when switching between various types of work. Thus, what is needed is a conductive platform liner that can be easily transported, installed, and stored.

SUMMARY

Embodiments of the invention solve the above-mentioned problems by providing a flexible conductive platform liner for an aerial work platform of an insulated aerial device. In some embodiments, the system comprises a liner composed of a flexible and electrically conductive material configured to be placed over the aerial work platform. In some embodiments, the liner is foldable and substantially light weight compared to the sheet metal platform liners of the prior art.

A first embodiment of the invention is directed to a platform liner configured to be placed over an aerial work platform of an insulated aerial device, the platform liner comprising a bottom section comprising an electrically conductive material, at least one side section comprising a flexible and electrically conductive material, a lip section configured to be placed over a lip of said aerial work platform, and an attachment mechanism for removably securing the platform liner to the aerial work platform.

A second embodiment of the invention is directed to a system for lining an aerial work platform of an insulated aerial device, the system comprising a conductive platform liner configured to be placed over the aerial work platform, the platform liner comprising a bottom section, at least one side section, a lip section configured to be placed over a lip of said aerial work platform, wherein at least one of the bottom section, the at least one side section, and the lip section comprise a flexible and electrically conductive material, and an attachment mechanism for removably securing the platform liner to the aerial work platform.

A third embodiment of the invention is directed to a method for conductively lining an aerial work platform of an insulated aerial device, the method comprising the steps of placing a flexible electrically conductive platform liner over the aerial work platform, wherein a bottom section of the platform liner is placed over a bottom of the aerial work platform, and wherein a lip section of the platform liner is placed over a lip of the aerial work platform, electrically bonding the platform liner to one of the insulated aerial device or an energized power line using at least one bonding cable, electrically bonding the platform liner to an operator using a tether, unbonding each of the platform liner, the energized power line, and the operator, and removing the platform liner from the aerial work platform.

Additional embodiments of the invention are directed to a flexible conductive platform liner including various accessories, such as zippers, buttons, bonding points, a rigid grate, and various attachment means for attaching the platform liner to an aerial work platform.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
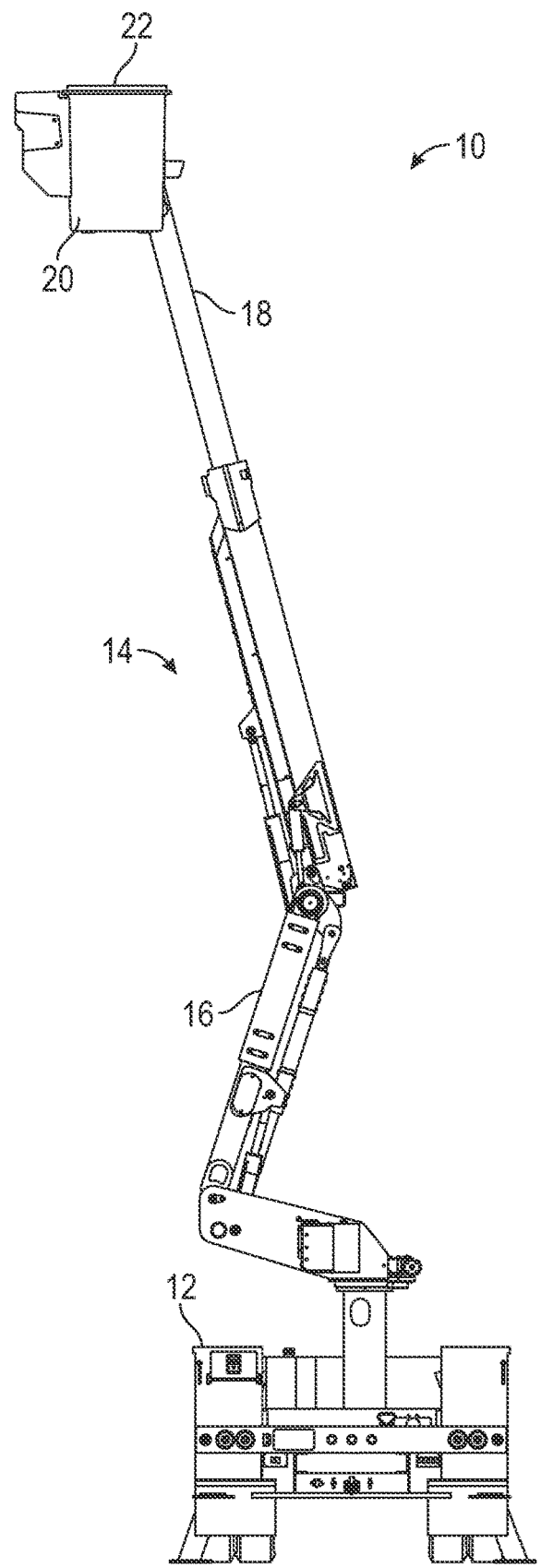
FIG. 1 depicts an insulated aerial device for some embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Turning first to FIG. 1, an insulated aerial device 10 for some embodiments of the invention is depicted. The insulated aerial device 10, in some embodiments, may be attached to a utility vehicle 12, as shown. The insulated aerial device 10 comprises a boom assembly 14 including a proximal end 16 and a distal end 18, and an aerial work platform 20. In some embodiments, a platform liner 22, which may be flexible and electrically conductive, is positioned within the aerial work platform 20. In some embodiments, various components of the insulated aerial device 10 may have electrically insulating properties, such as portions of the boom assembly 14 at the proximal end 16 and distal end 18, and the aerial work platform 20. For example, said components may be composed of an electrically insulating material such as fiberglass. Additionally, in some embodiments, components of the insulated aerial device 10 may be electrically conductive, such as the platform liner 22 and a boom tip of the boom assembly 14 at the distal end 18.

Figure 2A:
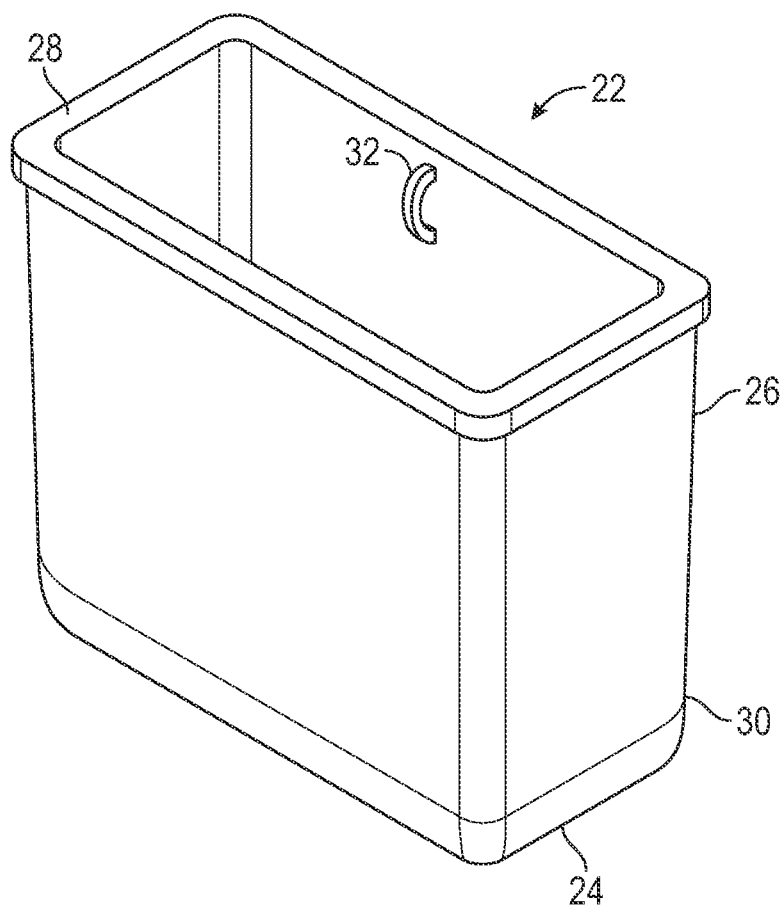
FIG. 2A depicts a platform liner for some embodiments of the invention.

Turning now to FIG. 2A, the platform liner 22 for some embodiments is depicted. In such embodiments, the platform liner 22 is flexible and electrically conductive. Said platform liner 22 is configured to be placed within or over the aerial work platform 20. In some embodiments, the platform liner 22 comprises a bottom section 24, a side section 26, a lip section 28, and a fastener 30 for joining the side section 26 to the bottom section 24. The bottom section 24 is configured to be placed over the bottom of the aerial work platform 20. The side section 26 is configured to be placed in the aerial work platform 20 such that the side section 26 contacts an interior surface of the aerial work platform 20. The lip section 28 is configured to be placed over a lip of the aerial work platform 20. As such, in some embodiments, each of the bottom section 24, the side section 26, and the lip section 28 are designed according to the shape and size of the aerial work platform 20. In some embodiments, the side section 26 may be composed of multiple sections connected together. In some embodiments, the lip section 28 is sized to extend past a lip of the aerial work platform 20, which may be desirable to secure the platform liner 22 to the aerial work platform 20.

The fastener 30 may be a suitable fastener, such as, a bolt, a weld, a latch mechanism, or a hem, as well as any other form of suitable fastener. Depending on the specific embodiment and the materials used for the platform liner 22, a specific fastener may be desirable. For example, in embodiments where each of the bottom section 24 and the side section 26 are composed of fabric, it may be desirable that the fastener 30 be a hem joining the side section 26 to the bottom section 24, as shown. In some embodiments, the side section 26 and the bottom section 24 are formed as a unitary piece.

Figure 6:
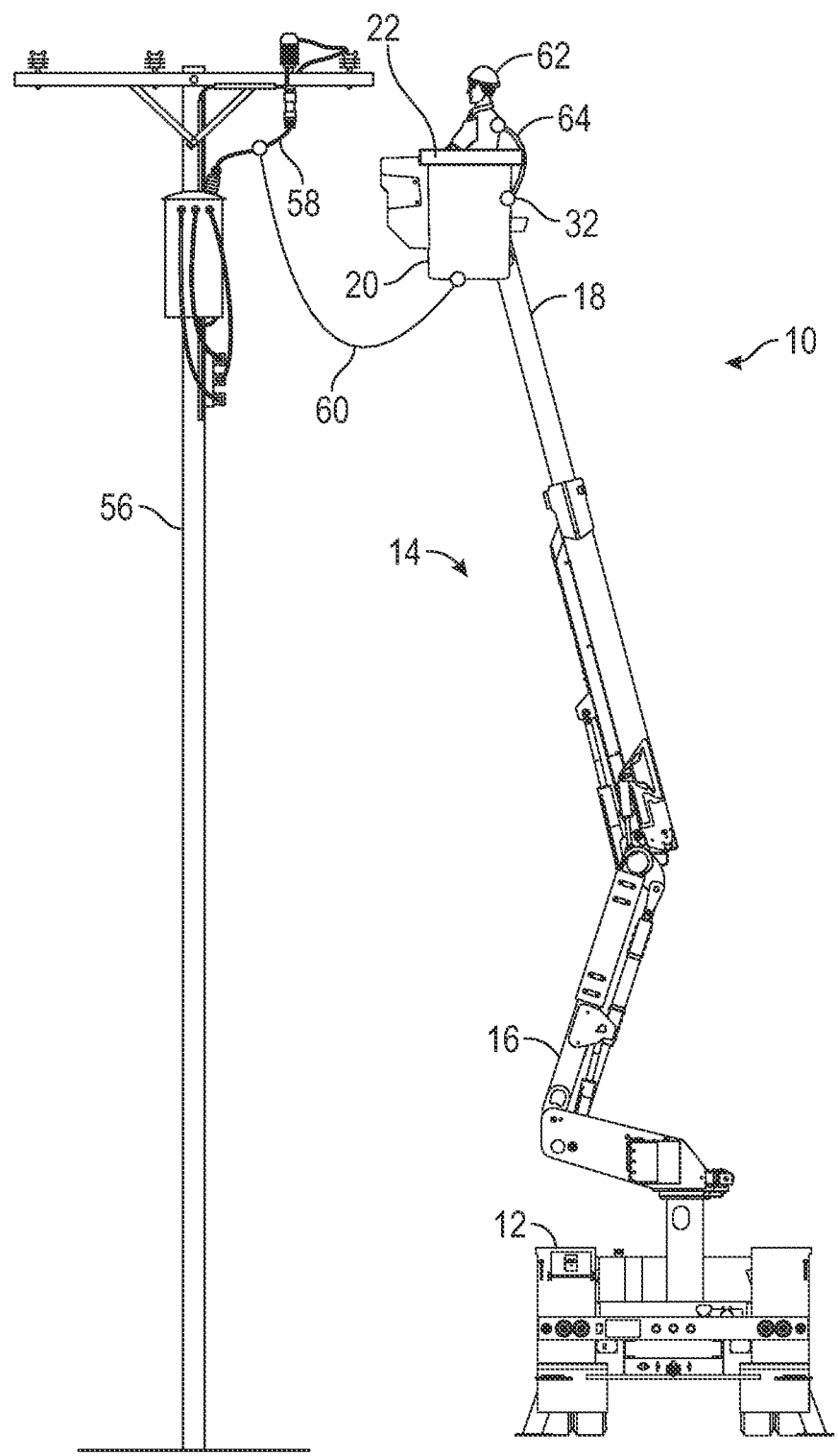
FIG. 6 depicts an exemplary operational environment for some embodiments of the invention.

In some embodiments, the platform liner 22 comprises at least one electrical tether or bonding point 32, such that an operator can be electrically bonded to the platform liner 22. In some embodiments, the bonding point 32 may be a loop secured to the platform liner 22 at one of the bottom section 24, side section 26, or lip section 28. The bonding point 32 may be configured to attach to and establish an electrical connection through a bonding cable 60 or an electrical tether 64, as shown in FIG. 6. In some embodiments, the platform liner 22 comprises a plurality of bonding points 32, such as a first bonding point disposed on an inner surface of the side section 26, as shown, configured to electrically bond an operator to the platform liner 22 and a second bonding point disposed on an outer portion of the platform liner 22 configured to electrically bond the platform liner 22 to at least one of an energized power line, the aerial work platform 20, or the distal end 18 of the boom assembly 14.

Electrical conductivity as recited herein refers to the ability of a material or components to conduct electricity. An electrically conductive material can transfer electricity with minimal electrical resistance and is therefore able to hold electrically bonded components at a similar electrical potential. Alternatively, an electrically insulating material has a relatively high electrical resistance and therefore reduces the ability of electricity to flow through the material.

It should be understood that in some embodiments, the platform liner 22 is sized to fit over the aerial work platform 20. In some embodiments, there may be many different aerial work platforms 20 of various shapes and sizes. For example, the shape of the aerial work platform 20 may be rectangular, D-shaped, or any other desired shape. Accordingly, various sizes of platform liners may exist for various sizes of respective platforms. For example, a large aerial work platform 20 may be 40×60" and thus require a large platform liner 22, while a small aerial work platform 20 may be 24"×24" and thus require a small platform liner 22.

Figure 2B:
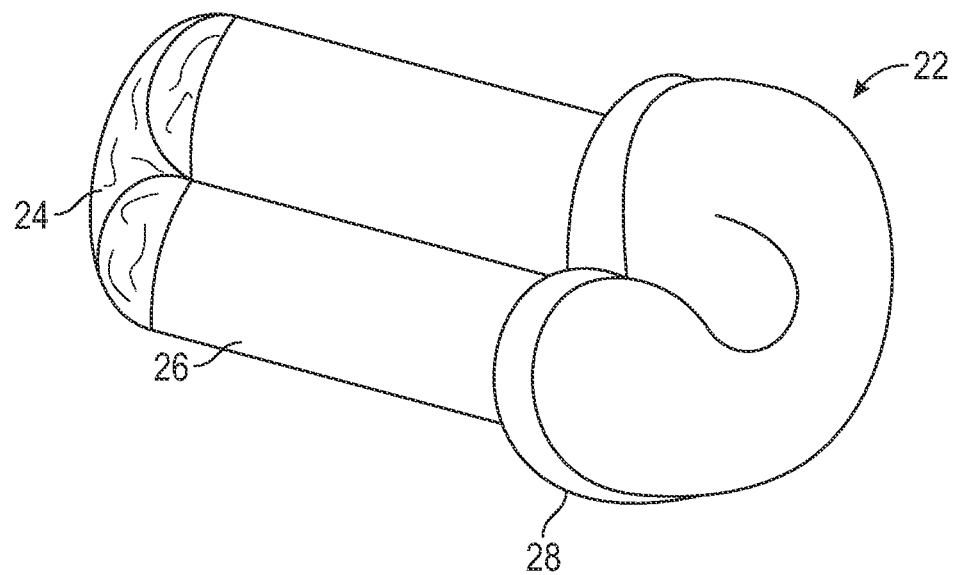
FIG. 2B depicts a platform liner in a folded configuration for some embodiments of the invention.

Turning now to FIG. 2B, the platform liner 22 of some embodiments is depicted in a folded or rolled configuration. Here, the platform liner 22 is composed of a flexible material and has been folded for storage or transport. It may be desirable to fold the platform liner 22, such that the platform liner 22 takes up less space. Thus, the platform liner 22 can be more easily handled by an operator. There may be a plurality of ways to fold the platform liner 22 depending on the specific shape and design of the platform liner 22, as well as the material composition.

Figure 3A:
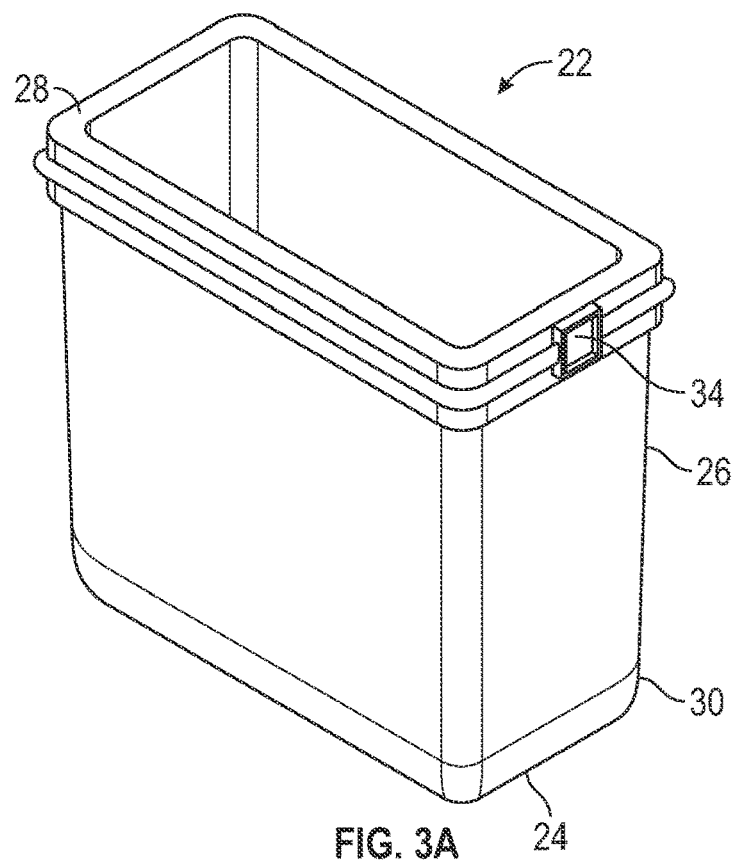
FIG. 3A depicts a platform liner with a cinch strap for some embodiments of the invention.

Turning now to FIG. 3A, a platform liner 22 with a cinch strap 34 for some embodiments is depicted. Here, the cinch strap 34 is used to secure the platform liner 22 to the aerial work platform 20 by tightening the cinch strap 34 around the lip of the aerial work platform 20. Here, an operator may first place the platform liner 22 over the aerial work platform 20, then tighten the cinch strap 34 over the lip section 28 and the lip of the aerial work platform 20. In some embodiments, the cinch strap 34 may be integrated into the lip section 28 of the platform liner 22. For example, the lip section 28 may comprise cutout portions or slits to receive the cinch strap 34 through. Thus, in some embodiments, the cinch strap 34 may be transported with the platform liner 22 and is not a separate component. Alternatively, in some embodiments, the cinch strap 34 is distinct from the platform liner 22 and is placed over the lip section 28 of the platform liner 22. The strap may be made of a fabric, such as nylon or another suitable fabric material and can have any type of clip, fastener, or clasp on the end thereof.

Figure 3B:
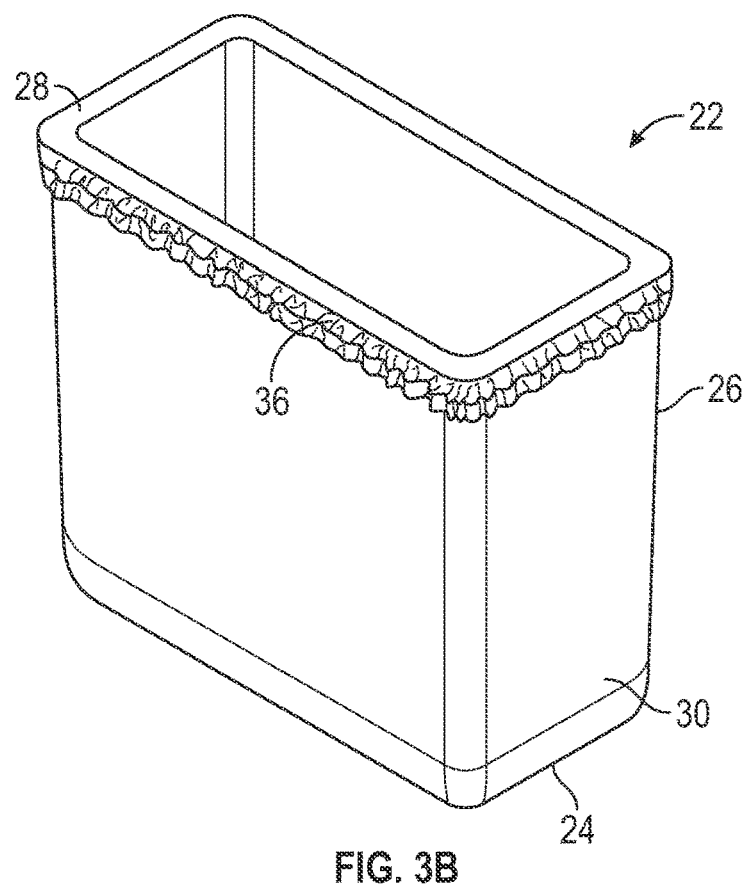
FIG. 3B depicts a platform liner with an elastic strap for some embodiments of the invention.

Turning now to FIG. 3B, a platform liner 22 with an elastic strap 36 for some embodiments is depicted. In some such embodiments, the elastic strap 36 is placed within the lip section 28 of the platform liner 22. Here, the lip section 28 may comprise a sleeve for receiving the elastic strap 36 therein. For example, the lip section 28 may be manufactured such that a portion of the lip section 28 is folded over the elastic strap 36 and stitched together to form the sleeve around the elastic strap 36. Alternatively, the elastic strap 36 may be otherwise connected to lip section 28.

Figure 3C:
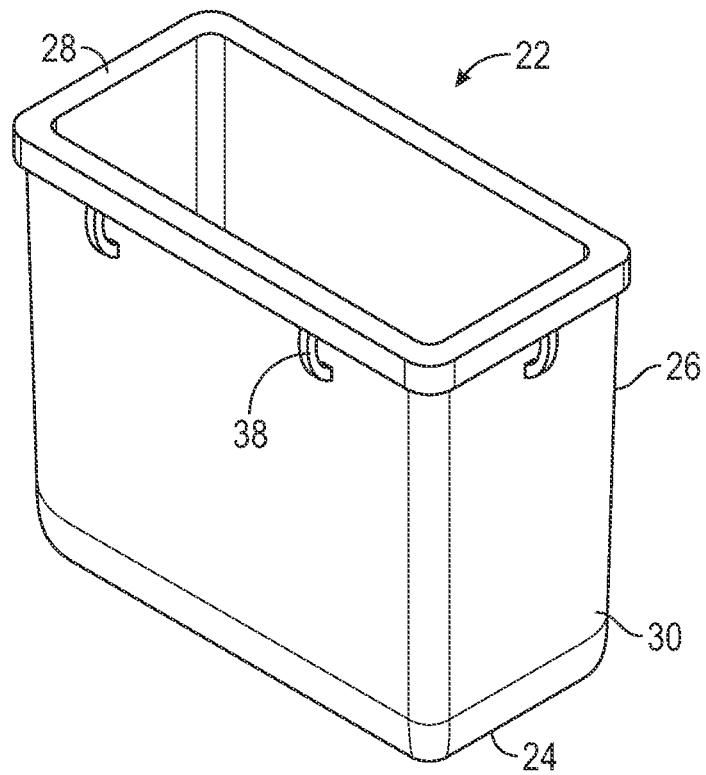
FIG. 3C depicts a platform liner with hooks for some embodiments of the invention.

Turning now to FIG. 3C, a platform liner 22 with hooks 38 for some embodiments is depicted. In some such embodiments, the hooks 38 may be attached at the end of the lip section 28, as shown. Here, the hooks 38 are configured to hook over the lip of the aerial work platform 20 to removably secure the platform liner 22 to the aerial work platform 20. In some embodiments, each of the hooks 38 is configured to hook around a respective anchoring point on the aerial work platform 20. Here, the aerial work platform 20 comprises a plurality of anchoring points which may be rigid loops configured to receive the hooks 38. Alternatively, in some embodiments, the hooks 38 may be latches configured to latch onto the anchoring points of the aerial work platform 20.

In some embodiments, the hooks 38 are part of a latching component of the platform liner 22. For example, the hooks 38 may be secured to a latch that is configured to tighten the hooks 38 over the lip of the aerial work platform 20. It should be understood that embodiments are also contemplated where at least one latching component is included in the platform liner 22 without hooks 38.

Figure 3D:
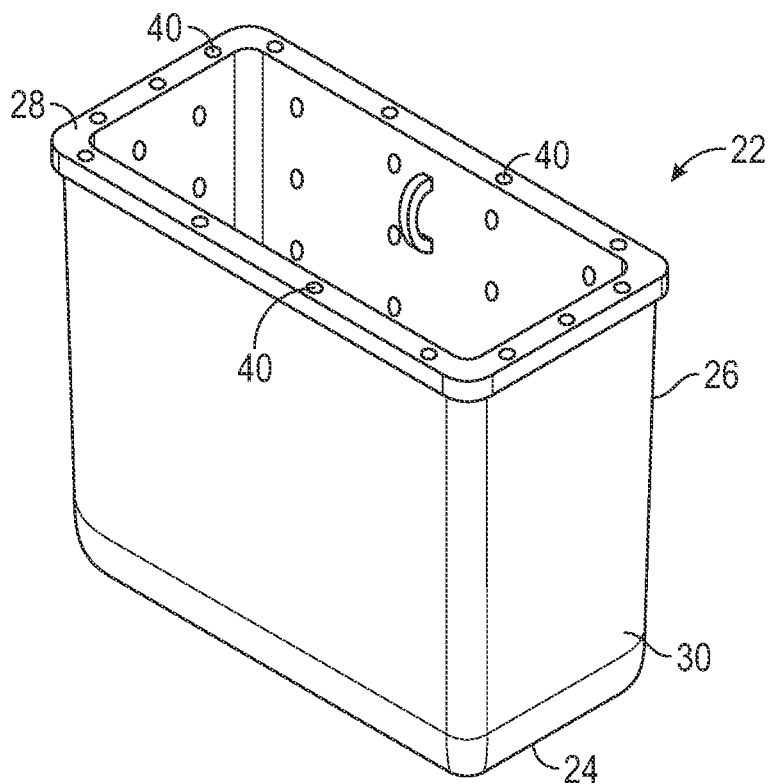
FIG. 3D depicts a platform liner with snap fasteners for some embodiments of the invention.

Turning now to FIG. 3D, a platform liner 22 with a plurality of snap fasteners 40 is depicted. In some embodiments, it may be desirable to include snap fasteners 40 along the interior surface of the aerial work platform 20 to attach the platform liner 22. The snap fasteners 40 may include a plurality of buttons placed on the aerial work platform 20 and a plurality of rings configured to snap over the buttons to thereby secure the platform liner 22 over the aerial work platform 20. The snap fasteners 40 may be desirable to quickly attach the platform liner 22 or remove the platform liner 22 from the aerial work platform 20. The snap fasteners 40 may be placed over the interior surface of the aerial work platform 20, as well as on the lip of the aerial work platform 20, as shown. It should be understood that various other configurations for the snap fasteners 40 are also contemplated.

In some embodiments, the snap fasteners 40 include a plurality of non-conductive, electrically insulating buttons disposed on the aerial work platform 20 to maintain the electrical insulating properties of the aerial work platform 20. For example, the buttons may be composed of fiber glass or a hard plastic material. In some embodiments, the rings disposed on the platform liner 22 configured to snap over the buttons may be composed of an electrically conductive material, such as a metal.

It should be understood that in some embodiments, various other forms of removable attachment may be employed to secure the platform liner 22 to the aerial work platform 20. For example, removable fasteners such as latches, zippers, and Velcro may be used, as well as other known removable fasteners. It should also be understood that various combinations of the fasteners described herein may be included. Further, in some embodiments, fasteners may not be present and the platform liner 22 is merely placed over the aerial work platform 20. In such embodiments, gravity is sufficient to hold the platform liner 22 in place. In some embodiments, it may be desirable to secure the platform liner 22 to the aerial work platform 20 using an attachment mechanism to prevent the platform liner 22 from folding or sliding around while installed on the aerial work platform 20. Further, in some embodiments, it may be desirable to secure the platform liner 22 to the aerial work platform 22 because the weight of the platform liner 22 itself may not be sufficient to hold the platform liner 22 in place.

Figure 4A:
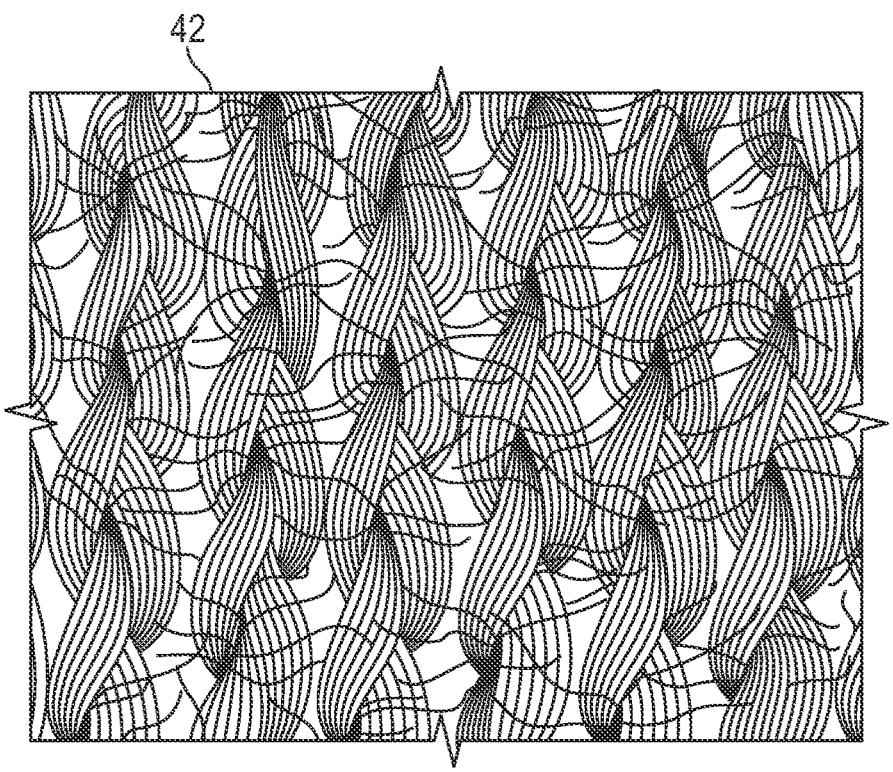
FIG. 4A depicts a metal fabric material for some embodiments of the invention.

Turning now to FIG. 4A, a conductive fabric material 42 for some embodiments is depicted. In such embodiments, the conductive fabric material 42 may be silver thread fabric, steel thread fabric, carbon fiber fabric, a combination thereof, or another suitable conductive fabric material. In some embodiments, the conductive fabric may be manufactured by applying a conductive coating onto a non-conductive fabric to achieve a suitable electrical conductivity. In some embodiments, at least a portion of the platform liner 22 is composed of the conductive fabric material 42. In some embodiments, it is desirable that at least a portion of the platform liner 22 is composed of conductive fabric material 42 because of the relatively light weight associated with conductive fabric material 42. In such embodiments, the platform liner 22 may be substantially lighter than 75 pounds.

Figure 4B:
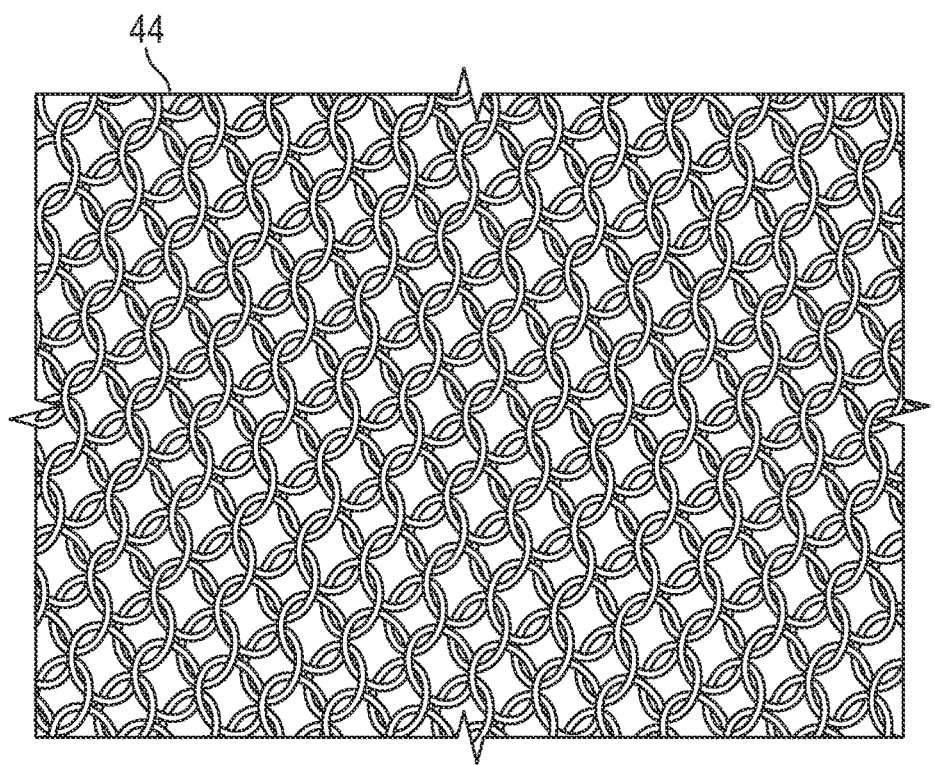
FIG. 4B depicts a chain mail material for some embodiments of the invention.

Turning now to FIG. 4B, a chain mail material 44 for some embodiments of the invention is depicted. In such embodiments, the chain mail material 44 may be any of stainless steel chain mail, silver chain mail, aluminum chain mail, a combination thereof, or another suitable conductive chain mail material. In some embodiments, at least a portion of the platform liner 22 is composed of the chain mail material 44. In some such embodiments, the chain mail material 44 may provide increased strength and durability. As such, it may be desirable to include the chain mail material 44 in at least a portion of the platform liner 22. For example, the bottom section 24 of the platform liner 22 may be composed of chain mail, such that the bottom section 24 is configured to support the weight of an operator standing on the bottom section 24.

It should be understood that various materials and combinations of materials may be employed to manufacture the platform liner 22. For example, in some embodiments, the bottom section 24 of the platform liner 22 is composed of stainless steel chain mail, while the side section 26 and lip section 28 are composed of silver thread fabric. Alternatively, in some embodiments, each section may be composed of a combination of materials. For example, a portion of the bottom section 24 may be composed of chain mail, while another portion may be composed of conductive fabric. Additionally, in some embodiments, the platform liner 22 is composed of a single material. For example, the platform liner 22 may be entirely composed of silver thread fabric.

Figure 5A:
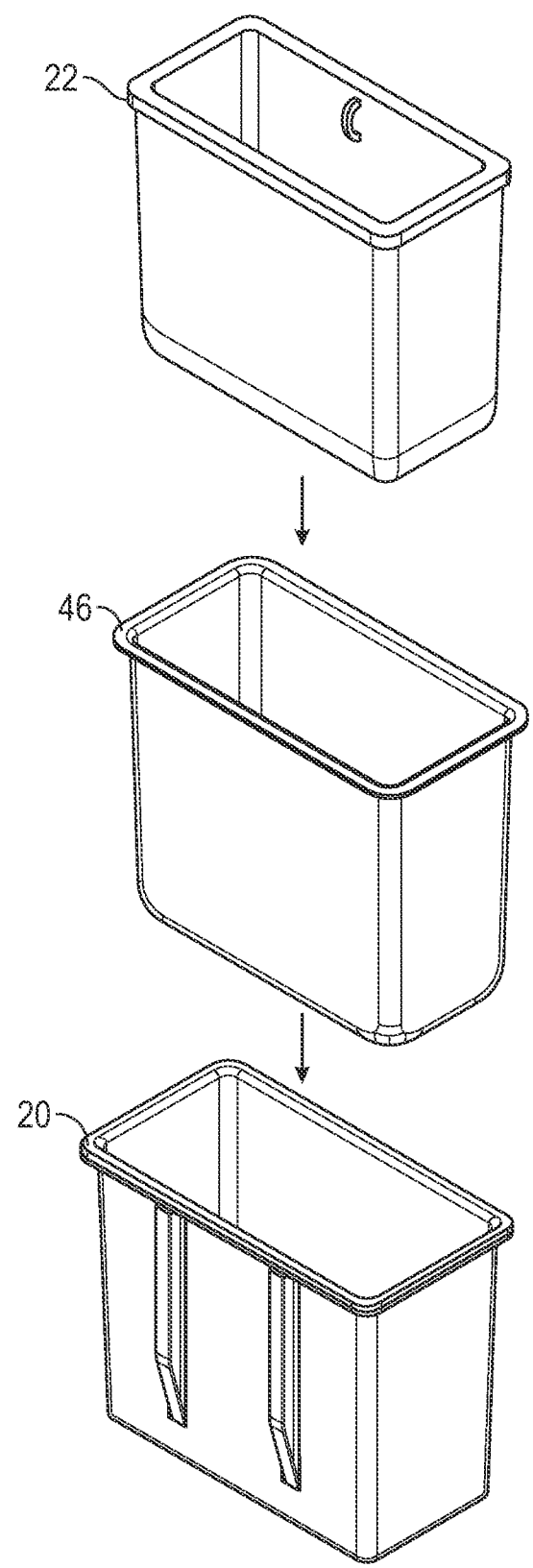
FIG. 5A depicts an exploded view of a platform liner over a poly liner on an aerial work platform.

Turning now to FIG. 5A, an exploded view of a platform liner 22 placed over a poly platform liner 46 in the aerial work platform 20 for some embodiments is depicted. In some embodiments, the poly platform liner 46 is composed of a plastic or composite material. For example, the poly platform liner 46 may be composed of polyethylene. The poly platform liner 46 may be used to cover the aerial work platform 20 during a gloving work operation. Gloving work as used herein refers to operations where an operator is at least partially electrically insulated while performing work on an electrical circuit. For example, the operator may wear electrically insulating rubber gloves. Thus, as another form of electrical insulation the poly platform liner 46 electrically insulates the platform 20 from the electrical circuit. In some embodiments, the platform liner 22 is placed over the poly platform liner 46. It may be desirable to place the platform liner 22 over the poly platform liner 46 after the poly platform liner 46 has been used for gloving work. Thus, the poly platform liner 46 is already positioned over the work platform 20 and will not need to be removed from the platform 20. As such, if an operator is preparing for barehand work, the platform liner 22 may be placed directly over the poly platform liner 46. Barehand work, which is distinct from gloving work, refers to operations where the operator and the platform liner 22 are electrically bonded to an electrical circuit, such as the circuit of an energized power line.

Figure 5B:
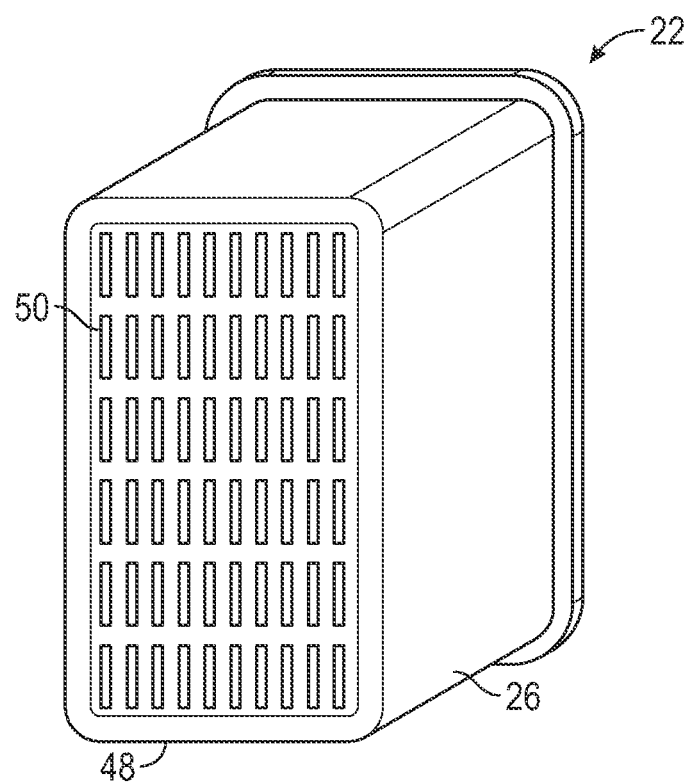
FIG. 5B depicts a platform liner with a bottom plate section for some embodiments of the invention.

FIG. 5B depicts the platform liner 22 with a bottom plate section 48 for some embodiments. Here, the bottom section 24 of other embodiments is replaced with the bottom plate section 48, which in some embodiments, is a rigid plate. The bottom plate section 48 may be composed of a conductive material, such as, steel, aluminum, another metal, or other conductive materials. For example, in some embodiments, the bottom plate section 48 is composed of carbon fiber. In some embodiments, at least a portion of the bottom plate section 48 comprises cutout slots 50, as shown. Here, the bottom plate section 48 is slotted to form a grate to reduce the weight of the bottom plate section 48 and thereby reduce the overall weight of the platform liner 22. Alternatively, in some embodiments, the bottom plate section 48 may be a solid plate with no portions cutout.

The bottom plate section 48 may be desirably included in the platform liner 22 to increase the strength of the bottom of the platform liner 22, on which an operator stands during operation. In embodiments that include the rigid bottom plate section 48, the bottom plate section 48 may increase the ease of installation of the platform liner 22. Here, the bottom plate section 48 may be dimensioned according to the bottom of the aerial work platform 20, such that the bottom plate section 48 fits within the aerial work platform 20. Accordingly, an operator may install the platform liner 22 by placing the bottom plate section 48 over the bottom of the aerial work platform 20 and lifting the lip section 28 over the lip of the aerial work platform 20.

In some embodiments, the bottom plate section 48 may be configured to support the side section 26 and lip section 28 during storage or transport. Accordingly, the side section 26 and lip section 28 may be folded and placed over the bottom plate section 48, such that the overall size of the platform liner 22 is significantly reduced.

It should be understood that other sections of the platform liner 22 may be designed similarly to the bottom plate section 48. For example, the side section 26 may be a rigid grate and/or the lip section 28 may be a rigid grate or rigid ring. It should further be understood that various combinations of these embodiments are also contemplated. For example, in one embodiment, each of the bottom section 24, the side section 26, and the lip section 28 comprise a rigid structure, while in another embodiment, the bottom section 24 is a rigid plate and side section 26 and lip section 28 are composed of a flexible material. Further, in some embodiments, at least a portion of any of the bottom section 24, the side section 26, and the lip section 28 may be a rigid plate.

It should be understood that embodiments are contemplated where the bottom section 24 is structurally reinforced. Here, a rigid plate such as the bottom plate section 48 of FIG. 5B may be attached to a flexible conductive portion of the bottom section 24 to reinforce the bottom section 24. Alternatively, other means of reinforcement are contemplated. For example, in some embodiments the bottom section 24 may be composed of multiple layers of chain mail, fabric, rigid plates, or any combination thereof. It should also be understood that other components of the platform liner 22 may be reinforced, such as the side section 26 and the lip section 28. Structural reinforcement of the platform liner 22 may be desirable to increase the strength and durability of the platform liner 22 for extended use.

Figure 5C:
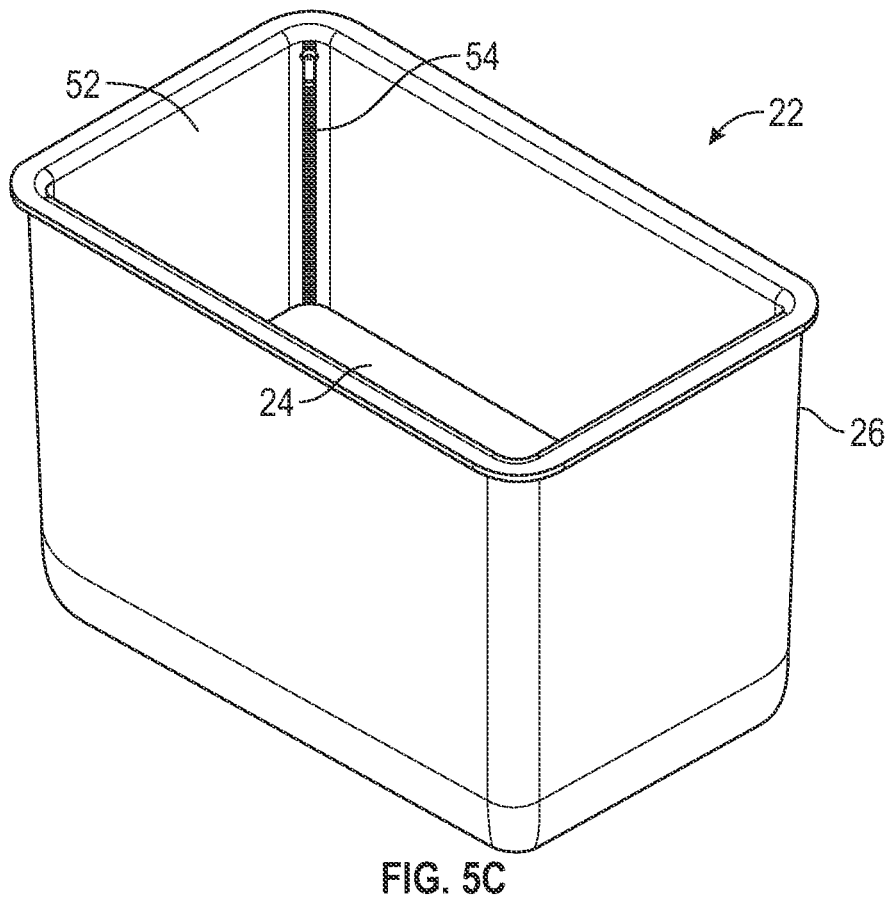
FIG. 5C depicts a platform liner with an additional section for some embodiments of the invention.

FIG. 5C depicts a platform liner 22 with an additional section 52 for some embodiments. Here, the platform liner 22 may be adjustable, such that the size and/or shape of the platform liner 22 can be altered. In such embodiments, an additional section 52 of the platform liner 22 may be fastened to at least one of the bottom section 24, the side section 26, and the lip section 28. In some embodiments, it may be desirable to use a fastener such as a zipper 54, as shown, or a snap fastener, as shown in FIG. 3D, such that the additional section 52 can be easily attached and detached from the platform liner 22. In such embodiments, the additional section 52 may be included to increase the size of the platform liner, for example, to fit into a larger aerial work platform 20. It should be understood that in some embodiments, where the additional section 52 is included, the connections of other sections, such as between the bottom section 24 and side section 26 may be removable connections. For example, the side section 26 may be attached to the bottom section 24 using zipper 54 or snap fasteners 40. Thus, the sections can be easily detached to receive the additional section 52.

Turning now to FIG. 6, an exemplary operational environment for some embodiments is depicted. Here, the insulated aerial device 10 is secured to the utility vehicle 12 which is positioned adjacent to a utility pole 56. The utility pole 56 comprises an energized power line 58 to which a bonding cable 60 of the insulated aerial device is attached. The attachment may be a form of electrical bonding that electrically bonds the energized power line 58 to a component of the insulated aerial device 10, such as, the platform, the boom tip, or another component. It may be desirable to electrically bond to the energized power line 58 to hold components of the insulated aerial device 10 at a similar electric potential to that of the energized power line 58 to avoid electrical discharge and electrical arcing.

In some embodiments, an operator 62 may be supported within the aerial work platform 20, as shown. In such embodiments, it may be desirable to electrically bond the operator 62 or an article of clothing of the operator 62 to the platform liner 22. For example, the operator 62 may be electrically bonded using an electrical tether 64 attached to the operator 62 and attached to the platform liner 22 at the bonding point 32.

It should be understood that the platform liner 22 of various embodiments is not limited to operations involving utility poles and energized power line. For example, the platform liner 22 may be used to perform other operations that require a conductive platform liner, such as electrical maintenance operations.

Figure 7:
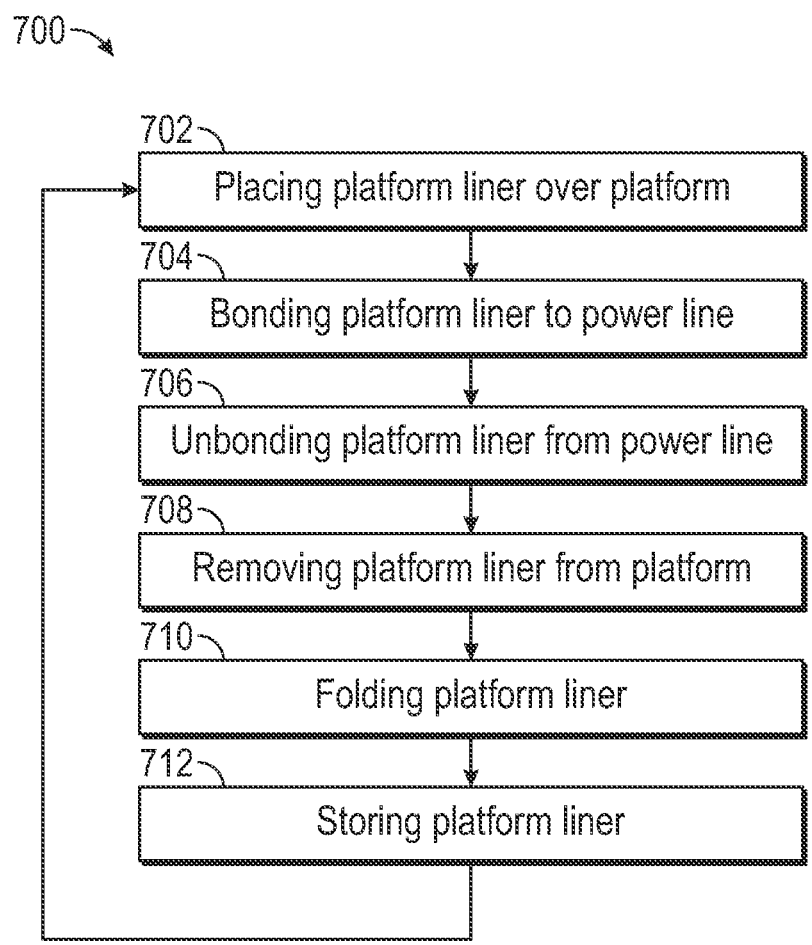
FIG. 7 depicts a method for some embodiments of the invention.

Turning now to FIG. 7, a diagram illustrating method steps for some embodiments is depicted. The method is generally referred to herein with reference numeral 700. At step 702 the platform liner 22 is placed over the aerial work platform 20 and may be optionally secured to the aerial work platform 20. Next, at step 704 the platform liner 22 is electrically bonded to the energized power line 58. The electrical bonding may be carried out by attaching tether 64 or bonding cable 60 to the platform liner 22. The platform liner 22 may be bonded to the energized power line 58 directly via a bonding cable 60 between the platform liner 22 and the energized power line 58 or indirectly via a bonding cable 60 between the platform liner 22 and another component that is already bonded to the energized power line 58, such as, for example, the boom tip at the distal end 18 of the boom assembly 14. This step may additionally involve electrically bonding the operator 62 to the platform liner 22 via tether 64, as shown in FIG. 6.

After the platform liner 22 has been electrically bonded, the operator 62 can perform operations while each of the operator 62, the aerial work platform 20, the platform liner 22, and the energized power line 58 are held at a similar electrical potential. Such operations may include maintenance operations, routine testing of the electrical power line 58, or other forms of maintenance and service operations.

At step 706 the platform liner 22 is unbonded from the energized power line 58. Here, unbonding may be carried out by breaking the electrical connection between the platform liner 22 and the energized power line 58. The electrical connection may be broken by removing the bonding cable 60 from the energized power line 58. After the platform liner 22 is unbonded, the platform liner 22 may be removed from the aerial work platform 20 at step 708. Here, the platform liner 22 may be lifted out of the aerial work platform 20. Before removing the platform liner 22, any fastener or attachment mechanism securing the platform liner 22 to the aerial work platform 20 may be removed or disengaged such that the platform liner 22 can be freely lifted from the aerial work platform 20.

After the platform liner 22 has been removed, the platform liner 22 may be folded at step 710. It may be desirable to fold the platform liner 22 to reduce the amount of space that the platform liner 22 takes up. In some embodiments, the platform liner 22 may be folded into a similar configuration as shown in FIG. 2B. It should be understood that the step of folding the platform liner 22 is optional and in some embodiments, the platform liner 22 is not folded. At step 712 the platform liner 22 is stored. Here, the platform liner 22 may be placed in a storage shed, in a storage cabinet, on a storage rack, or in the utility vehicle 12, such as in a bed or in a cab of the utility vehicle 12. In some embodiments, it may be specifically desirable to fold the platform liner 22 before storage and transport to reduce the footprint of the platform liner 22.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A platform liner configured to be placed over an aerial work platform of an insulated aerial device, the platform liner comprising:
   a bottom section comprising an electrically conductive material;
   at least one side section comprising a flexible and electrically conductive material;
   a lip section configured to be placed over a lip of said aerial work platform;
   an attachment mechanism for removably securing the platform liner to the aerial work platform;
   a first bonding point connector for electrically bonding the platform liner to an operator; and
   a second bonding point connector for electrically bonding the platform liner to said insulated aerial device.

2. The platform liner of claim 1, wherein at least a portion of the platform liner comprises a chain mail material.

3. The platform liner of claim 1, wherein at least a portion of the platform liner comprises a metal fabric.

4. The platform liner of claim 1, wherein the attachment mechanism is selected from a group consisting of: at least one elastic strap, at least one cinch strap, a plurality of snaps, and a plurality of hooks.

5. The platform liner of claim 1, wherein the platform liner further comprises a fastener for connecting the bottom section to the at least one side section.

6. The platform liner of claim 1, wherein the platform liner weighs less than about 75 lbs.

7. The platform liner of claim 1, wherein the bottom section comprises a rigid plate.

8. A platform liner configured to be placed over an aerial work platform of an insulated aerial device, the platform liner comprising:
   a bottom section comprising an electrically conductive material;
   at least one side section comprising a flexible and electrically conductive material;
   a lip section configured to be placed over a lip of said aerial work platform;
   an attachment mechanism for removably securing the platform liner to the aerial work platform,
   wherein the platform liner weighs less than about 75 lbs.

9. The platform liner of claim 8, further comprising:
   a first bonding point connector for electrically bonding the platform liner to an operator; and
   a second bonding point connector for electrically bonding the platform liner to said insulated aerial device.

10. The platform liner of claim 8, wherein at least a portion of the platform liner comprises a chain mail material.

11. The platform liner of claim 8, wherein at least a portion of the platform liner comprises a metal fabric.

12. The platform liner of claim 8, wherein the attachment mechanism is selected from a group consisting of: at least one elastic strap, at least one cinch strap, a plurality of snaps, and a plurality of hooks.

13. The platform liner of claim 8, wherein the platform liner further comprises a fastener for connecting the bottom section to the at least one side section.

14. A conductive platform liner configured to be placed over an aerial work platform of an insulated aerial device, the platform liner comprising:
   a bottom section comprising an electrically conductive material;
   at least one side section comprising a flexible and electrically conductive material;
   a lip section configured to be placed over a lip of said aerial work platform;
   an attachment mechanism for removably securing the platform liner to the aerial work platform,
   wherein at least a portion of the platform liner comprises a chain mail material or a metal fabric;
   and a poly platform liner,
   wherein the conductive platform liner is configured to be placed over the poly platform liner.

15. The platform liner of claim 14, further comprising:
a first bonding point connector for electrically bonding the platform liner to an operator; and
a second bonding point connector for electrically bonding the platform liner to said insulated aerial device.

16. The platform liner of claim 14, wherein the attachment mechanism is selected from a group consisting of: at least one elastic strap, at least one cinch strap, a plurality of snaps, and a plurality of hooks.

17. The platform liner of claim 14, wherein the platform liner further comprises a fastener for connecting the bottom section to the at least one side section.

18. The platform liner of claim 14, wherein the bottom section comprises a rigid plate.

19. The platform liner of claim 14, wherein the platform liner weighs less than about 75 lbs.

\* \* \* \* \*